(12) United States Patent  
Barzegar et al.

(10) Patent No.: US 7,860,224 B1
(45) Date of Patent: Dec. 28, 2010

(54) METHOD AND APPARATUS FOR PROVIDING A VOICEMAIL NOTIFICATION

(75) Inventors: Farhad Barzegar, Branchburg, NJ (US); Irwin Gerszberg, Kendall Park, NJ (US); Thomas Hill, Oviedo, FL (US); Scott Mollica, Red Bank, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1072 days.

(21) Appl. No.: 11/602,839

(22) Filed: Nov. 21, 2006

(51) Int. Cl.
*H04M 1/64* (2006.01)

(52) U.S. Cl. .................................... 379/88.17; 709/217

(58) Field of Classification Search .............. 379/88.12, 379/88.17, 88.18; 709/217
See application file for complete search history.

(56) References Cited

U.S. PATENT DOCUMENTS

2004/0205151 A1* 10/2004 Sprigg et al. ................ 709/217

* cited by examiner

*Primary Examiner*—Creighton Smith

(57) ABSTRACT

A method and apparatus for providing a voicemail notification to a subscriber or customer in a communication network are disclosed. For example, the present method uses a wireless integrated access device (WIAD) to interact with a voicemail server via the Internet. The WIAD determines whether a newly saved voicemail exists for a customer and then interacts with at least one endpoint device that is located at a customer premise to provide a voicemail notification to the customer if a newly saved voicemail exists for the customer.

20 Claims, 4 Drawing Sheets

METHOD AND APPARATUS FOR PROVIDING A VOICEMAIL NOTIFICATION

The present invention relates generally to communication networks and, more particularly, to a method and apparatus for providing a notification to a user of the existence of a voicemail in a communication network, e.g., packet networks such as Voice over Internet Protocol (VoIP) networks.

BACKGROUND OF THE INVENTION

When a calling party attempts to call a called party but the called party is busy or does not answer, the network may transfer the calling party to a voicemail system to allow the calling party to leave a voicemail for the called party. Generally, an incumbent local exchange carrier (ILEC) will redirect the call to a toll free number associated with a service provider that is currently providing telephony service and voicemail service to the called party (i.e., a subscriber of the service provider). The service provider will store the voicemail into an account associated with the called party. The service provider will also provide an access number (e.g., a toll free number) where the called party is able to retrieve the stored voicemail.

Unfortunately, the subscriber must actively dial the access number to determine whether there is a newly saved voicemail. This is inconvenient to the subscriber and causes a delay in the subscriber being notified that a newly saved voicemail has been stored in the service provider's voicemail system.

In some systems, a stutter tone can be provided by a local switch to indicate to the subscriber that there is a new voicemail when the subscriber activates an endpoint device (e.g., picking up a handset of a telephone). However, this feature is only possible if the ILEC who owns the local switch is also providing the voicemail service to the subscriber. In other words, if the service provider that provides the voicemail service to the subscriber does not own the local switch, then the voicemail system of the service provider does not communicate with the local switch of the ILEC to allow the local switch to provide the stutter tone signal.

Therefore, a need exists for a method and apparatus for providing a voicemail notification to a subscriber in a communication network, e.g., a packet network.

SUMMARY OF THE INVENTION

In one embodiment, the present invention discloses a method and apparatus for providing a voicemail notification to a subscriber or customer in a communication network. For example, the present method uses a wireless integrated access device (WIAD) to interact with a voicemail server via the Internet. The WIAD determines whether a newly saved voicemail exists for a customer and then interacts with at least one endpoint device that is located at a customer premise to provide a voicemail notification to the customer if a newly saved voicemail exists for the customer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
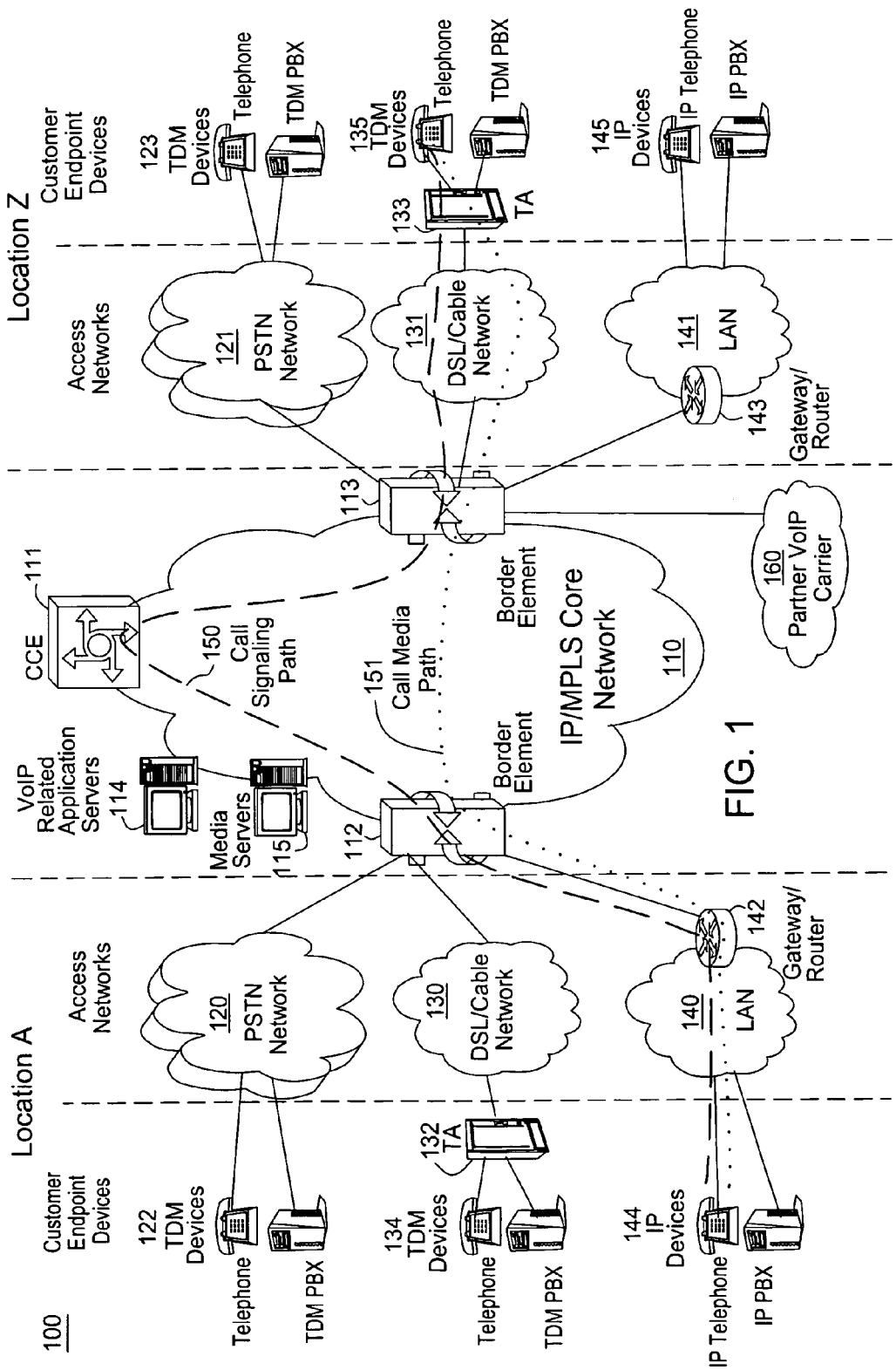
FIG. 1 illustrates an illustrative packet network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be networked by either a Circuit switched network or a packet switched network. Circuit switched customer endpoint devices 122, 123, 134, and 135 typically comprise of analog or digital phones or Private Branch Exchange (PBX). Packet switched customer endpoint devices 144 and 145 typically comprise IP phones or IP PBX. The Terminal Adaptors (TA) 132 and 133 are used to provide necessary interworking functions between circuit switched customer endpoint devices, such as analog phones, and packet based access network technologies, such as Digital Subscriber Loop (DSL) or Cable broadband access networks. Circuit switched customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either circuit or packet based. A circuit switched public switched telephone network (PSTN), including its associated signaling, call control mechanisms and services, 120 or 121 is used to support circuit switched customer endpoint devices connected via traditional phone lines. A packet based access network, such as Frame Relay, ATM, Ethernet or IP, is typically used to support IP based customer endpoint devices via a customer LAN, e.g., 140 with a VoIP gateway and router 142. A packet based access network 130 or 131, such as Fiber, DSL or Cable, when used together with a TA 132 or 133, is used to support customer endpoint devices developed for use with a circuit switched PSTN.

The core VoIP infrastructure comprises of several key VoIP components, such as the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

Calls that originate or terminate in a different carrier can be handled through the PSTN 120 and 121 or the Partner IP Carrier 160 interconnections. Originating or terminating PSTN calls can be handled via existing PSTN interconnections to the other carrier. Originating or terminating VoIP calls can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using a circuit switched PSTN device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate PSTN device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using circuit switched endpoint device 123 with PSTN access network 121. The BEs 112 and 113 are responsible for the necessary signaling protocol translation, e.g., SS7 to and from SIP, and media format conversion, such as circuit switched voice format to and from IP based packet voice format.

As discussed above, a service provider, e.g., the service provider who is operating the core network 110, may also provide a voicemail service to its customers. Unfortunately, this service provider may not own the local switch that is deployed in one of the access networks shown on FIG. 1. Under such scenario, the customers may have to repeatedly dial a toll free number to gain access to stored voicemails. One reason is that the service provider is unable to notify the customers of the existence of the stored voicemail because the service provider's voicemail system is not in communication with the local switch that is serving the customers. Namely, the local switch may be owned by an ILEC who is not providing the voicemail service to the customers.

To address this criticality, the present invention employs a wireless integrated access device (WIAD) that is deployed on the customer's premise (e.g., a home or an office) to interact with the voicemail system or voicemail server 114 of the service provider. Once the WIAD is made aware of the existence of at least one newly stored voicemail for the customer, the WIAD is able to trigger a notification indicator, e.g., a visible indicator or an audible indicator, on at least one endpoint device deployed at the customer's premise.

Figure 2:
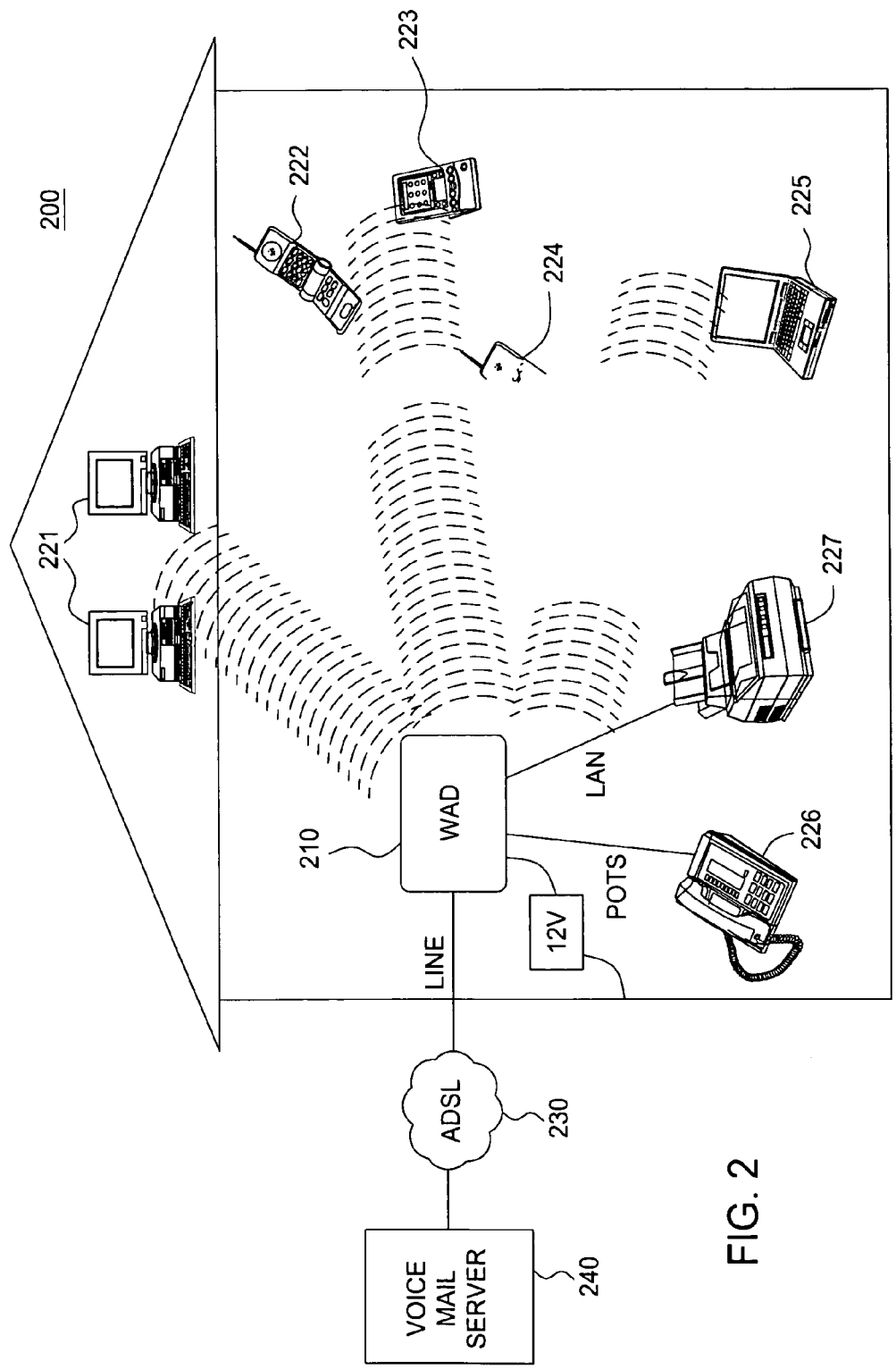
FIG. 2 illustrates an example of a wireless integrated access device that is deployed in a customer premise related to the present invention.

FIG. 2 illustrates an example of a wireless integrated access device 210 that is deployed in a customer premise 200 related to the present invention. In one embodiment, the wireless integrated access device (WIAD) 210 is deployed in a customer premise, e.g., a home, that is in wireless communication with a plurality of endpoint devices (e.g., desktop computers 221, a cordless digital telephone 222, a wireless computing device 223 (e.g., a personal digital assistant (PDA) and the like, a cellular phone 224, and a laptop computer 225. In one embodiment, the wireless integrated access device (WIAD) 210 may optionally interact with a traditional wired telephone 226 and one or more wired devices 227 (e.g., a printer) that are connected via a local area network (LAN).

One novel aspect of the present invention is that the WIAD 210 is in communication with a voicemail server 240 via a broadband access network 230, e.g., a Fiber network, a DSL network or a Cable network. More specifically, the WIAD is in communication with the voicemail server 240 via the Internet. In one embodiment, the WIAD is implemented with a software application that allows the WIAD to interact with the voicemail server 240 via the Internet in accordance with a predefined time interval, e.g., every 10 minutes, every 30 minutes, every hour, and so on. The WIAD interacts with the voicemail server 240 to determine whether there is at least one newly saved voicemail for a customer, e.g., the WIAD may provide a phone number, a customer ID, a customer name, a customer user name, an email address, and the like. If the WIAD detects that a newly saved voicemail exists, then the WIAD will cause at least one of the endpoint devices, e.g., 221-225, to provide a visible notification and/or an audible notification to the customer.

For example, in one embodiment, if a newly saved voicemail exists, then the WIAD will cause an endpoint device, e.g., a computer 221, 225 or a wireless computing device 223 to display an icon, e.g., a blinking or flashing icon, to appear on a display of the endpoint device to notify the customer that a voicemail has been saved for the customer. If the computer 221 or 225 is equipped with the appropriate input/output devices (e.g., speakers, microphone, key pad, and the like), the customer can simply use the computer to directly obtain the voicemail by initiating a call, e.g., dialing a toll free number to obtain the voicemail.

In one embodiment, if a newly saved voicemail exists, then the WIAD will cause an endpoint device, e.g., a digital wireless phone 222 or a cellular phone 224 to display a visible indicator, e.g., a blinking or flashing icon if a screen is available or activating an light emitting diode (LED), e.g., a glowing LED or a blinking LED if a screen is not available, to notify the customer that a voicemail has been saved for the customer. The customer can simply then use the digital wireless phone 222 or a cellular phone 224 to directly obtain the voicemail by initiating a call, e.g., dialing a toll free number to obtain the voicemail.

In one embodiment, if a newly saved voicemail exists, then the WIAD will cause an endpoint device to provide an audible indicator, e.g., a stutter tone, when one of the endpoint devices is used to make an out-bound call. Alternatively, an audible sound via a speaker can also be generated by the endpoint device even if a call is not being made. It should be noted that the stutter tone is provided by the WIAD and not a local switch operated by the ILEC.

Figure 3:
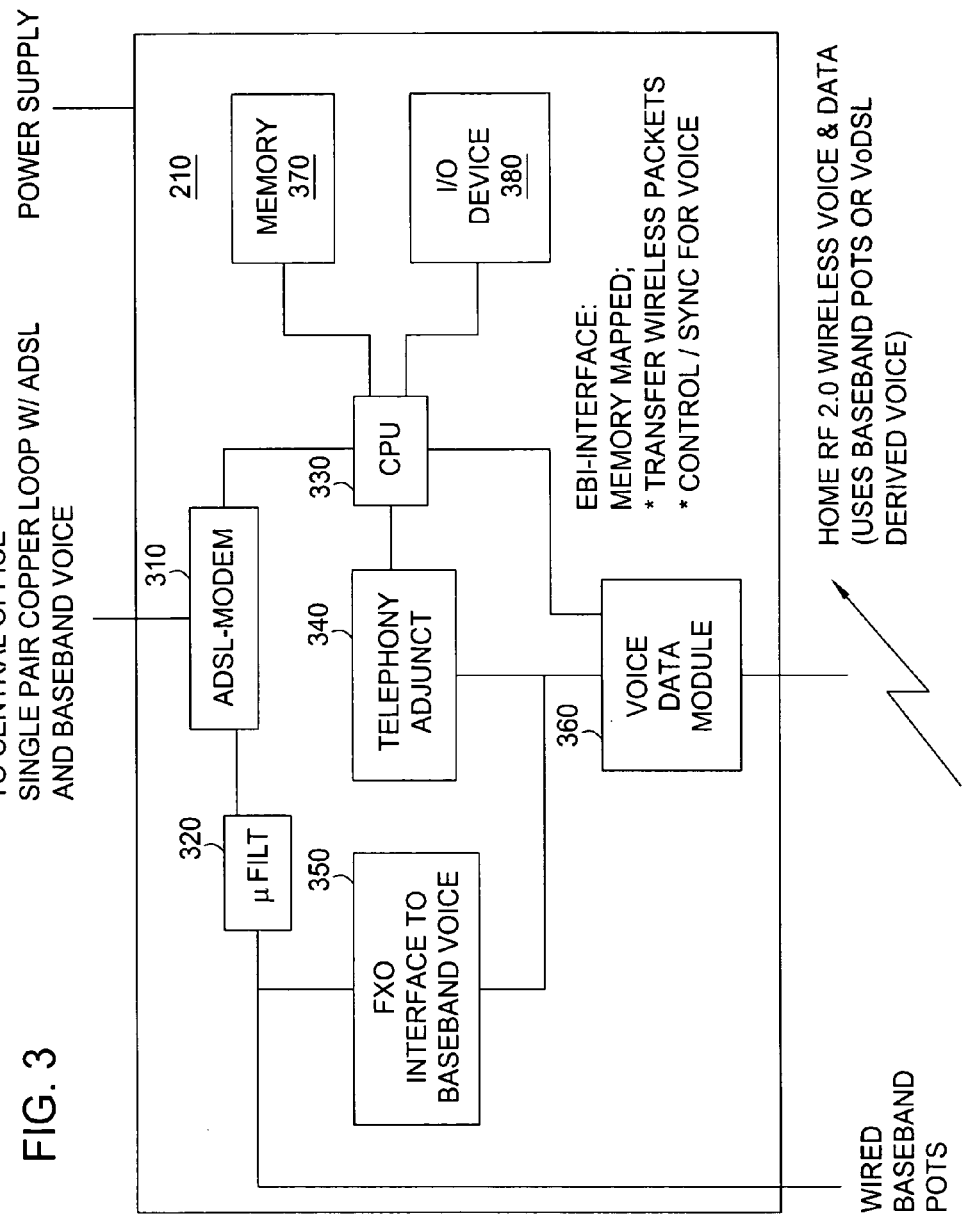
FIG. 3 illustrates a block diagram of an illustrative wireless integrated access device.

FIG. 3 illustrates a block diagram of an illustrative wireless integrated access device 210. In one embodiment, the WIAD comprises a broadband modem, e.g., an ADSL or cable modem 310, a micro filter 320, a processor 330, a Telephony Adjunct 340 to provide extra digital voice lines from the broadband data, a Foreign Exchange Office (FXO) interface 350 to interface with ordinary POTS lines, a wireless Voice Data Module (VDM) 360 to provide the voice and data to a customer's endpoint devices wirelessly, a memory 370 e.g., random access memory (RAM) and/or read only memory (ROM), and I/O devices 380 (e.g., storage devices, including but not limited to, a tape drive, a floppy drive, a hard disk drive or a compact disk drive, a receiver, a transmitter, a speaker, a timer, a display, a speech synthesizer, an output port, and a user input device (such as a keyboard, a keypad, a mouse, and the like)).

In one embodiment, the WIAD 210 is connected to a phone line from the local telephone service provider. For example, the line is ADSL-enabled with a digital voice adjunct server in the Central Office (CO). On this line, a customer may receive the original POTS line service via the micro-filter 320, while the ADSL modem 310 will provide the broadband data. Namely, the basic POTS line voice line information is separated by the integrated micro-filter 320.

In one embodiment, the processor or CPU 330 may also provide router/firewall functionalities to protect the customer equipment. In one embodiment, the Telephony Adjunct 340 provides extra digital voice lines from the broadband data, e.g., up to two additional voice lines are digitally created by the integrated Telephony Adjunct (TA).

Finally, the data (non-voice data) and voice data are passed on wirelessly by the VDM to the various endpoint devices, e.g., wireless phones and computers in the customer premise. In one embodiment, the VDM uses a transceiver to communicate with the various endpoint devices.

In one embodiment, the PC 221 and/or 225 at the customer premise would have a wireless PC card that would register with the VDM 360 for receiving and transmitting data to the Internet via the ADSL modem to the CO and from there to the Internet. Similarly, when one of the wireless phones 222, 224 (broadly defined as a handset) is used, messages from the handset are transmitted to the VDM and through the DSL modem to the CO for connection with a telephony server.

In one embodiment, using wireless connections for the voice lines will remove the necessity of having to provide in-home wiring to endpoint devices. Furthermore, using the WIAD 210 for transmission of both non-voice data and voice data also ensures that the quality of service for the voice calls will be maintained. For example, when a voice call is made in the middle of a file download, the WIAD can ensure that packet losses or delay on voice call will be minimized at the expense of decreasing the download throughput.

In one embodiment, the WIAD 210 communicates with the various endpoint devices via an IP protocol. As such, each of the endpoint devices is an IP client of the WIAD.

Figure 4:
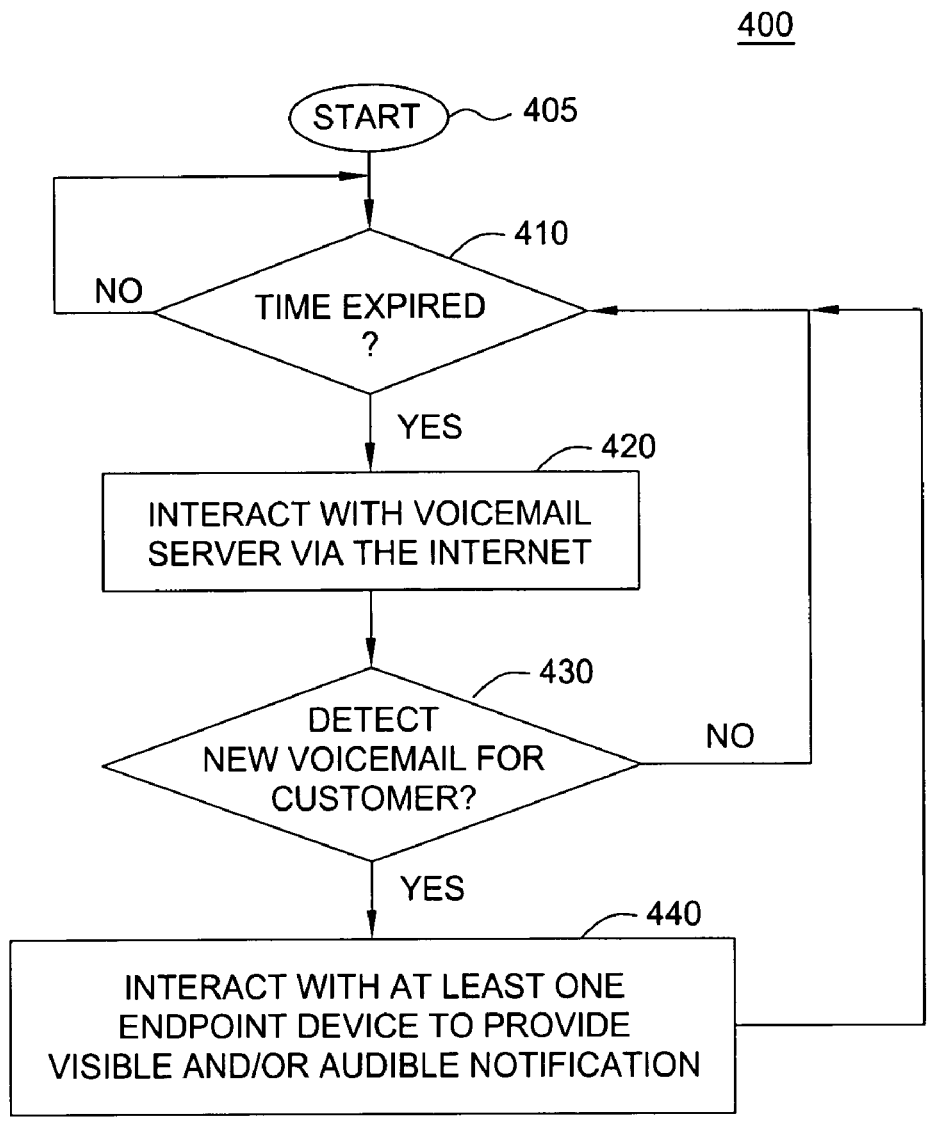
FIG. 4 illustrates a flowchart of a method for providing a voicemail notification.

FIG. 4 illustrates a flowchart of a method 400 for providing a voicemail notification. For example, method 400 can be implemented by the WIAD of the present invention. Method 400 starts in step 405 and proceeds to step 410.

In step 410, method 400 checks to see whether a timer has expired. For example, method 400 determines whether a predefined time interval has elapsed. If the predefined time interval has not elapsed, then method 400 returns to step 410. If the predefined time interval has elapsed, then method 400 proceeds to step 420 and the timer is reset.

In step 420, the method 400 interacts with a voicemail server via the Internet. For example, the WIAD communicates with the voicemail server via the Internet by providing customer identification associated with a customer to the voicemail server.

In step 430, method 400 determines whether there are any newly saved voicemails for the customer. If there are no newly saved voicemails for the customer, then method 400 returns to step 410. If there are newly saved voicemails for the customer, then method 400 proceeds to step 440.

In step 440, method 400 interacts with at least one endpoint device located at the customer premise to provide a visible and/or an audible notification that a newly saved voicemail exists. Method 400 then returns to step 410.

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process for providing voicemail notification can be loaded into memory and executed by processor to implement the functions as discussed above. As such, the present method for providing voicemail notification (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a voicemail notification, comprising:

using a wireless integrated access device to interact with a voicemail server via an Internet;

determining whether a newly saved voicemail exists for a customer; and interacting with at least one endpoint device located at a customer premise to provide a voicemail notification if a newly saved voicemail exists for said customer.

2. The method of claim 1, wherein said voicemail notification comprises at least one of: a visible notification, or an audible notification.

3. The method of claim 2, wherein said visible notification comprises at least one of: a display of an icon on a screen, or activating a light emitting diode (LED).

4. The method of claim 2, wherein said audible notification comprises at least one of: a stutter tone when said at least one endpoint device is used to make a call or an audible sound via a speaker.

5. The method of claim 1, wherein said wireless integrated access device interacts with said voicemail server via a broadband access network.

6. The method of claim 5, wherein said broadband access network comprises at least one of: a Fiber network, a Digital Subscriber Loop (DSL) network or a cable network.

7. The method of claim 1, wherein said wireless integrated access device interacts with said voicemail server in accordance with a predefined time period.

8. A computer-readable medium having stored thereon a plurality of instructions, the plurality of instructions including instructions which, when executed by a processor, cause the processor to perform the steps of a method for providing a voicemail notification, comprising:
    using a wireless integrated access device to interact with a voicemail server via an Internet;
    determining whether a newly saved voicemail exists for a customer; and
    interacting with at least one endpoint device located at a customer premise to provide a voicemail notification if a newly saved voicemail exists for said customer.

9. The computer-readable medium of claim 8, wherein said voicemail notification comprises at least one of: a visible notification, or an audible notification.

10. The computer-readable medium of claim 9, wherein said visible notification comprises at least one of: a display of an icon on a screen, or activating a light emitting diode (LED).

11. The computer-readable medium of claim 9, wherein said audible notification comprises at least one of: a stutter tone when said at least one endpoint device is used to make a call or an audible sound via a speaker.

12. The computer-readable medium of claim 8, wherein said wireless integrated access device interacts with said voicemail server via a broadband access network.

13. The computer-readable medium of claim 12, wherein said broadband access network comprises at least one of: a Fiber network, a Digital Subscriber Loop (DSL) network or a cable network.

14. The computer-readable medium of claim 8, wherein said wireless integrated access device interacts with said voicemail server in accordance with a predefined time period.

15. An apparatus for providing a voicemail notification, comprising:
    means for interacting with a voicemail server via an Internet;
    means for determining whether a newly saved voicemail exists for a customer; and
    means for interacting with at least one endpoint device located at a customer premise to provide a voicemail notification if a newly saved voicemail exists for said customer.

16. The apparatus of claim 15, wherein said voicemail notification comprises at least one of: a visible notification, or an audible notification.

17. The apparatus of claim 16, wherein said visible notification comprises at least one of: a display of an icon on a screen, or activating a light emitting diode (LED).

18. The apparatus of claim 16, wherein said audible notification comprises at least one of: a stutter tone when said at least one endpoint device is used to make a call or an audible sound via a speaker.

19. The apparatus of claim 15, wherein said means for interacting interacts with said voicemail server via a broadband access network.

20. The apparatus of claim 19, wherein said broadband access network comprises at least one of: a Fiber network, a Digital Subscriber Loop (DSL) network or a cable network.

* * * * *